Jan. 22, 1957 J. H. WEBSTER 2,778,707
MAXIMUM SPEED INDICATING DEVICES
Filed Aug. 31, 1953
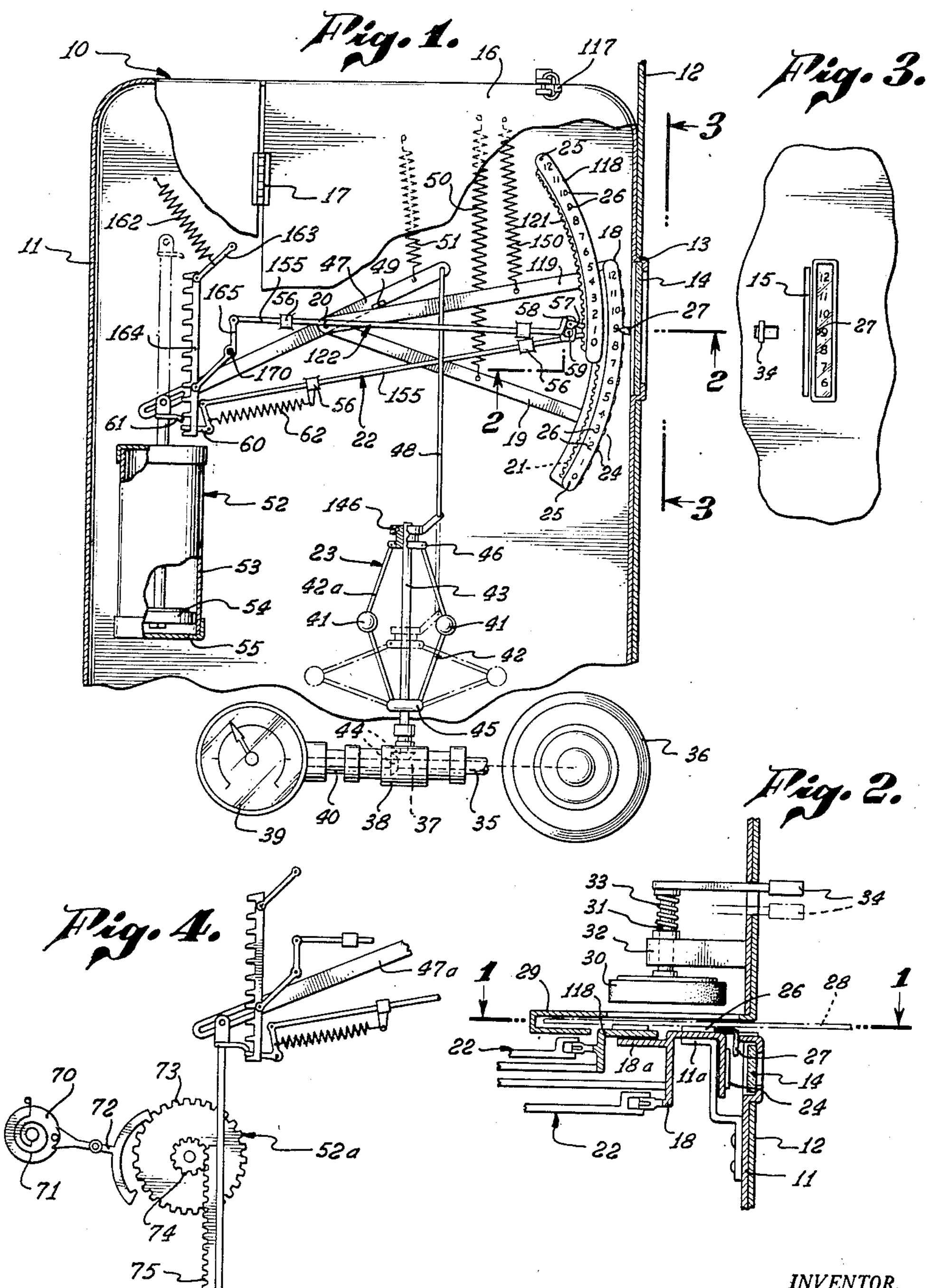
INVENTOR.
JOSEPH H. WEBSTER,
BY
ATTORNEY.

United States Patent Office 2,778,707

Patented Jan. 22, 1957

2,778,707

MAXIMUM SPEED INDICATING DEVICES

Joseph H. Webster, Medford, Oreg.

Application August 31, 1953, Serial No. 377,387

11 Claims. (Cl. 346—18)

This invention relates to improved apparatus for indicating and recording the maximum speed which a vehicle has been traveling. In certain respects, the present devices may be considered improvements in the type of maximum speed indicator disclosed and claimed in my copending application Ser. No. 338,065, filed February 20, 1953.

In the above mentioned application, I have disclosed a device adapted to be installed in automobiles and other motor vehicles, and which indicates to a police officer or other person the maximum speed which a vehicle has travelled since it was last stopped. A major object of the present invention is to provide a device which is very similar to this prior arrangement, but in which an indication is given as to the speed at which the vehicle had been traveling just prior to the time at which an indication is obtained, as distinguished from its maximum speed since last being stopped. For this purpose, I employ apparatus which retains a maximum speed indication for only a limited period of time after a reduction in speed of the vehicle. A time delay unit is employed to retain the indication for the desired period.

Preferably, the apparatus of the present invention is employed in conjunction with that of my prior application, to give indications of both the maximum speed attained since last stopping, and the maximum speed attained just prior to the time at which the indication is obtained. For each of these indications, I may employ a speed responsive indicating element, together with holding means operable to releasably retain the element in a maximum speed position. One of the elements may be releasable after a predetermined delay period following a reduction in speed to any of a number of different speeds, while the other element is releasable only after a delay period following complete stopping of the vehicle. The two elements may be actuated by a common speed responsive unit, and the holding elements may be released by a common speed responsive unit.

As in my prior invention, the apparatus is desirably so designed that a police officer may make a permanent record of the maximum speed indications after stopping of the vehicle. This record may be formed on a piece of paper, typically a traffic ticket, by mechanically pressing the ticket against raised speed markings on the two indicator elements.

The above and other features and objects of the present invention will be better understood from the following detailed description of the typical embodiments illustrated in the accompanying drawing, in which:

Fig. 1 is a side view, partially broken away, of a maximum speed recording unit embodying the invention;

Fig. 2 is a section taken on line 2—2 of Fig. 1; the plane of Fig. 1 extends along line 1—1 of Fig. 2;

Fig. 3 is a front view of the apparatus, taken on line 3—3 of Fig. 1; and

Fig. 4 is a fragmentary view of the time delay unit of a variational form of the invention.

Referring first to Fig. 1, the speed recording apparatus 10 of the invention is shown contained within a housing 11, which is mounted in an automobile or other motor vehicle within sight of the driver. More specifically, the housing may typically be mounted behind the dash 12 of the vehicle, and may be visible and accessible through an opening 13 in the dash. Housing 11 has sheet metal or other walls extending about and closing all sides of the housing, except at the location of opening 13 in the dash. At that location, the housing has a transparent viewing window 14, and a vertically elongated slot 15 through which a sheet of paper may be partially inserted into the device. One of the side walls of the housing 11 preferably takes the form of a door 16, typically hinged to the housing at 17, and adapted to be swung to an open position in which the inner mechanism of the device is accessible for repair or replacement. Door 16 is preferably retained closed by a lead seal 117 which is not to be broken except by police or other authorities.

The inner mechanism of the device includes two vertically elongated indicator and recording elements 18 and 118, which are individually mounted by a pair of swinging arms 19 and 119 for swinging movement about a common shaft 20. Elements 18 and 118 preferably extend arcuately about their axis of swinging movement, and at their forward sides have laterally turned portions carrying vertical series of ratchet teeth 21 and 121, engageable respectively by a pair of locking units 22 and 122. Upon increases in speed of the vehicle, elements 18 and 118 are actuated downwardly by a speed responsive unit 23, and are temporarily retained by lock units 22 and 122 in positions corresponding to the maximum speed attained by the vehicle.

Element 18 has at its forward side a series of markings 24, which are visible to the driver through window 14, and which indicate the maximum vehicle speed. The lateral faces 25 of elements 18 and 118 carry a number of raised markings 26 which also indicate vehicle speed, and which are utilized for impressing a permanent record of the maximum vehicle speed onto a sheet of paper. A reference marker 27 is stationarily fastened to the housing, and has portions indicating the reading on scales 24 and 26 for any particular setting of element 18. More specifically, a forward portion of reference marker 27 is positioned for viewing with scale 24 through window 14, while a side portion of marker 27 is received alongside lateral face 25 of element 18, and is positioned to impress a reference indication on a sheet of paper 28 as the paper is pressed against raised markings 26.

Behind slot 15, I provide a sheet metal element 29, which is shaped to form a narrow recess, into which a corner portion of paper 28 is insertible. At one side, this sheet metal is broken away sufficiently to expose paper 28 to recording faces 25 of elements 18 and 118. At its opposite side, the sheet metal is broken away, so that a presser element 30 may be moved laterally against the paper, to press the paper against recording faces 25 at the location of reference marker 27. Presser element 30 is preferably formed of a resiliently deformable material, such as rubber, and by its lateral movement against paper 28 acts to form on the paper impressions of reference marker 27 and some of the raised markings 26 on elements 18 and 118. Presser element 30 may typically be carried by a rigid shaft 31, which is mounted by bearing 32 for axial movement toward and away from elements 18 and 118, and is yieldingly urged away from elements 18 and 118 by spring 33. Shaft 31 and the carried presser elements are actuable against element 18 by a manually actuated handle 34 which projects through an opening in housing 11 to a position which is accessible to the driver. A sheet metal backing element 11*a*, attached to housing 11, is provided at the side of element 18 opposite the side at which presser 30 is located, to back element 18 against movement during stamping of a paper 28 by the presser. For similarly backing element 118, element 18 has an arcuate portion 18*a* which is received at a side of element 118 opposite that at which the presser is located.

The speed responsive unit 23 within housing 11 is driven by the usual speedometer actuating flexible rotary power transmitting connection 35, which is diagrammatically illustrated as driven by a wheel 36 of the vehicle. The power transmitting connection 35 is attached to and actuates a shaft 37 within a fitting 38 in the housing 11. Shaft 37 in turn drives the usual speedometer 39 through a connection 40.

Speed responsive unit 23 may typically be of the illustrated centrifugally actuated type normally used in mechanical governors, including a number of circularly spaced rotating weights 41 pivotally attached to swinging arms 42 and 42*a*. These weights and arms are carried by and rotate with a vertical shaft 43, which is rotatably driven by shaft 37 through bevel gears 44. At their lower ends, the lower arms 42 are pivotally attached to a collar 45, which is attached in fixed relation to shaft 43. The upper ends of the upper arms 42*a* are pivotally attached to an axially movable collar 46. As will be understood, an increase in the speed of rotation of shaft 43, resulting from an increase in speed of the vehicle, causes weights 41 to swing radially outwardly against the tendency of spring 51, to move upper collar 46 downwardly along shaft 43.

Vertical movement of collar 46 upon change in vehicle speed is utilized to swing a lever 47, through an axially movable connecting link 48, which is pivotally connected at its opposite ends to lever 47 and a nonrotating sleeve 146 carried by collar 46. This lever 47 is preferably mounted for swinging movement about the same shaft 20 that mounts arms 19 and 119, and is located between those arms. Lever 47 has two laterally projecting ears 49, which project in opposite direction across the upper sides of arms 19 and 119 respectively, to transmit clockwise swinging movement from lever 47 to both arms, while permitting counter-clockwise swinging movement of the lever independently of the arms. Arm 19, arm 119, and lever 47 are independently urged in a counterclockwise direction by individual coil springs 50, 150 and 51, anchored at their upper ends to the housing.

Upon a decrease in speed of the vehicle, the resulting counter-clockwise swinging movement of lever 47 is retarded or slowed by a time delay dash pot unit 52, including a cylinder 53 and vertically movable piston 54. As will be understood, such counterclockwise swinging of lever 47 can be effected only as fast as air can flow out of cylinder 53 through a lower restricted outlet opening 55. Opening 55 is sufficiently small as to require a substantial length of time for lever 47 to return to its zero speed position from an actuated position. Preferably, the return of lever 47 from a 60 miles per hour position should take between about 2 and 4 minutes.

Each of the lock elements 22 and 122 comprises an elongated rod 155 which is mounted for axial movement by a pair of bushing 56 attached to the housing. At its rear end, each of these rods pivotally carries a swinging ratchet pawl 57, which is engageable with ratchet teeth 21 or 121 of element 18 or 118 in the illustrated active positions of element 22 and 122. Upward swinging movement of pawls 57 beyond their Fig. 1 positions is prevented by pawl engaging ears 58 on rods 155, while downward swinging movement of the pawls is yieldingly resisted by springs 59. Pawls 57, in their positions of engagement with element 18 or 118, are thus downwardly deflectible to permit downward or speed increasing advancement of elements 18 and 118, while preventing upward movement of those elements. Elements 18 and 118 are therefore retained in any downwardly actuated position until release of lock elements 22 and 122 respectively by forward or leftward movement of the lock elements as seen in Fig. 1. Lock element 122 is retracted in this forward direction by counter-clockwise swinging movement of a bell crank 165 pivotally mounted at 170. One arm of crank 165 is pivotally attached to the left end of rod 155 of element 122, and the other arm is pivoted to a vertically movable toothed rack 164. A swinging arm 163 is pivoted at one end to the housing and at the other end to an upper portion of rack 164, to form with crank 165 a parallelogram type of mounting for the rack. A spring 162 yieldingly urges rack 164 upwardly to a position in which pawl 57 of locking unit 122 operatively engages teeth 121.

Rack 164 is deflectible downwardly to a position retracting unit 122 out of holding engagement with teeth 121 by engagement of a lug 61 on piston unit 54 with any one of the teeth on the rack. The rack teeth are so spaced as to be actuated by lug 61 at positions corresponding to a number of different predetermined speeds, as for instance at 10 M. P. H., 20 M. P. H., 30 M. P. H., etc., up to the maximum attainable speed of the vehicle. The timing of the dashpot 52 may be such as to allow about 45 seconds delay between actuations of successive teeth on the rack by lug 61 when the dashpot movement is unrestrained by speed responsive unit 23.

The second locking unit 22 is released by lug 61 through a crank 60 upon complete return of the dashpot to a position representing zero speed of the vehicle. Lock element 22 and crank 60 are yieldingly urged toward their active locking positions by a coil spring 62, whose ends are anchored to crank 60 and one of the bushings 56 respectively.

In driving a vehicle equipped with the apparatus of Figs. 1 to 3, increases in the speed of the vehicle and wheel 36 cause an increase in the speed of rotation of shaft 43 of the speed responsive unit 23. This causes weights 41 to move outwardly and pull collar 46 downwardly, in a manner swinging lever 47 in a clockwise direction. This swinging movement is transmitted by ears 49 to arms 19 and 119, which carry and move downwardly the indicating elements 18 and 118. The speed increase is indicated to the driver by the positioning of markings 24 on element 18 relative to reference marker 27. Upon a subsequent decrease in speed, pawls 57 retain elements 18 and 118 in positions corresponding to the maximum speed attained, while lever 47 and the speed responsive unit 23 return to reduced speed positions. If the vehicle is slowed sufficiently, lug 61 will, after a delay introduced by dash pot 52, engage one of the teeth on rack 164 and thereby retract locking unit 122. This frees indicating element 118 for return from the maximum speed position to a position representing the actual reduced speed of the vehicle. Element 118 thus retains a maximum speed indication only for a limited period of time following a reduction in speed.

When the vehicle is completely stopped, lever 47 and speed responsive unit 23 return to their zero positions, after a delay period introduced by the resistance of dash pot 52. As the delay period ends, lug 61 carried by piston unit 52 actuates bell crank 60 to retract lock unit 22 and its pawl 57, and thus release indicator element 18 for upward movement to its zero speed position.

It will be apparent from the above discussion that upon stopping of the vehicle, element 18 indicates the maximum speed attained by the vehicle since it was last stopped. Element 118, on the other hand, is held in a position representing the maximum speed attained just prior to stopping of the vehicle. Both of these elements are held in their actuated positions for a long enough period to permit a police officer to make a permanent record of the indications, by inserting the corner of a traffic ticket 28 into slot 15 and then actuating handle 34 to press the ticket against raised markings 26 and reference marker 27.

Fig. 4 illustrates fragmentarily a variational form of the invention, which is identical with that of Figs. 1 to 3 except that a different type of time delay unit is substituted for the unit 52 of the first form. Specifically, the Fig. 4 arrangement employs a mechanical escapement mechanism diagrammatically represented at **52*a*, which acts to delay or slow the counter-clockwise swinging movement of a lever 47*a* corresponding to the lever 47 of Fig. 1. The escapement mechanism 52*a* is typically and diagrammatically represented as comprising a rotatably oscillating balance wheel 70 and its spring 71, a pivotally oscillating member 72, and a toothed gear 73 whose movement is controlled by the oscillations of member 72. Gear 73 carries a smaller gear 74, which engages a rack 75**, to introduce a time delay in downward return of the rack following a reduction in vehicle speed.

The invention is not to be considered as limited to the specific structures described above, but includes broadly all equivalents of those structures. For example, while the invention has been described as applied to a vehicle, certain aspects of the invention may of course be applicable to other mechanisms whose maximum speeds of operation it may be desirable to record. When applied to a vehicle, it is believed that this device will tend to deter the operator from exceeding legal speeds, and will thereby reduce accidents.

In connection with both forms of the invention, it is noted that the mounting of rack 164 and the shape of lug 61 and the rack teeth are such that engagement of lug 61 with any tooth of the rack, during upward movement of the lug as well as downward movement, will deflect the rack laterally to pass the lug beyond the engaged tooth.

I claim:

1. Apparatus for use in a motor vehicle comprising means responsive to changes in speed of the vehicle, an element movable by said speed responsive means in accordance with said speed changes, holding means operable to retain said element in a position representing the maximum speed at which the vehicle has been traveling even after a reduction in speed to a lower value, and means in addition to said holding means then operable after a delay period following said reduction in speed but while the vehicle is still moving to release said holding means and permit return of said element to a condition representing the actual reduced speed of the vehicle, said holding means being constructed to positively retain said element in said maximum speed position for a substantial period of time without permitting any return of said element toward said reduced speed condition, and to then allow relatively rapid return of said element in said direction when released by said additional means.

2. Apparatus for use in a motor vehicle as recited in claim 1, in which said last mentioned means are conditioned for release of said holding means by reduction of the vehicle speed to any of a plurality of predetermined values.

3. Apparatus for use in a motor vehicle as recited in claim 1, including means for recording said maximum speed condition of said element while the element is held in said position by said holding means.

4. Apparatus for use in a motor vehicle comprising means responsive to changes in speed of the vehicle, an element movable by said speed responsive means in accordance with said speed changes, holding means operable to retain said element in a position representing the maximum speed at which the vehicle has been traveling even after a reduction in speed to a lower value, a time delay unit displaceable in a first direction by said speed responsive means upon increases in the vehicle speed and returning at a predetermined delay rate in a reverse direction upon decreases in speed, and means operable to release said holding means upon return of said time delay unit to any of a plurality of predetermined positions corresponding to a plurality of different vehicle speeds, said holding means being constructed to positively retain said element in said maximum speed position while said time delay unit returns in said reverse direction toward one of said plurality of positions.

5. Apparatus for use in a motor vehicle comprising means responsive to changes in speed of the vehicle, two indicating elements operable by said speed responsive means to conditions representing the vehicle speeds, first and second holding means operable upon a reduction in speed to temporarily hold said elements respectively in positions representing the maximum speed at which the vehicle has been traveling, means operable after a delay period following said reduction in speed but while the vehicle is still moving to automatically release said first holding means and thereby permit return of the first of said elements from maximum speed position to a position representing the actual speed of the vehicle, and means operable only upon substantially complete stopping of the vehicle to automatically release said second holding means and permit return of said second element to zero speed position.

6. Apparatus for use in a motor vehicle as recited in claim 5, in which said last mentioned means include time delay means conditioned by return of the vehicle speed to zero and automatically releasing said second element after a delay period following reduction of the vehicle speed from said maximum speed.

7. Apparatus for use in a motor vehicle as recited in claim 5, including means for recording the maximum speed indications of both of said elements.

8. Apparatus for use in a motor vehicle as recited in claim 5, including a common time delay unit introducing a delay period into said automatic release of both of said holding means.

9. Apparatus for use in a motor vehicle as recited in claim 5, in which both of said elements carry speed representing markings, said apparatus including means for recording the positions of said markings on both of said elements while the elements are retained by said holding elements in said maximum speed positions.

10. Apparatus for use in a motor vehicle comprising means responsive to changes in speed of the vehicle, two indicating elements operable by said speed responsive means to conditions representing the vehicle speeds, first and second holding means operable upon a reduction in speed to temporarily hold said elements respectively in positions representing the maximum speed at which the vehicle has been traveling, a time delay unit displaceable in a first direction by said speed responsive means upon increases in vehicle speed and returning at a predetermined delay rate in a reverse direction upon decreases in speed, means operable to automatically release said first holding means upon return of said time delay unit to any of a plurality of predetermined positions corresponding to a plurality of different vehicle speeds, and means responsive only to complete return of said time delay unit to a position corresponding to zero vehicle speed to release said second holding means.

11. Apparatus for use in a motor vehicle as recited in claim 10, in which each of said elements comprises a toothed arcuate element carrying speed markings and mounted for swinging movement in accordance with speed variations, and each of said holding means comprises a releasable ratchet pawl engageable with the teeth on said element.

References Cited in the file of this patent

UNITED STATES PATENTS

| | | |
|---|---|---|
| 1,078,138 | Frick | Nov. 11, 1913 |
| 1,443,040 | Rebori | Jan. 23, 1923 |
| 1,448,043 | Tillander | Mar. 13, 1923 |
| 2,149,478 | Triner | Mar. 7, 1939 |
| 2,262,007 | Kollsman | Nov. 11, 1941 |
| 2,614,239 | Smith et al. | Oct. 14, 1952 |